US009945683B1

(12) United States Patent
Ledet

(10) Patent No.: US 9,945,683 B1
(45) Date of Patent: Apr. 17, 2018

(54) TRANSPORT COMMUNICATION

(71) Applicant: OPEN INVENTION NETWORK LLC, Durham, NC (US)

(72) Inventor: David Gerard Ledet, Allen, TX (US)

(73) Assignee: Open Invention Network LLC, Durham, NC (US)

(*) Notice: Subject to any disclaimer, the term of this patent is extended or adjusted under 35 U.S.C. 154(b) by 0 days.

(21) Appl. No.: 14/155,451

(22) Filed: Jan. 15, 2014

(51) Int. Cl.
*G01C 21/34* (2006.01)
*G01C 21/00* (2006.01)
*G06Q 30/02* (2012.01)

(52) U.S. Cl.
CPC ........ *G01C 21/3484* (2013.01); *G01C 21/00* (2013.01); *G01C 21/3476* (2013.01); *G06Q 30/0256* (2013.01); *G06Q 30/0266* (2013.01)

(58) Field of Classification Search
None
See application file for complete search history.

(56) References Cited

U.S. PATENT DOCUMENTS

| | | | | |
|---|---|---|---|---|
| 7,647,166 B1* | 1/2010 | Kerns | ................ | G01C 21/3679 701/412 |
| 7,856,360 B2* | 12/2010 | Kramer | ................ | G06Q 30/02 705/1.1 |
| 8,719,094 B1* | 5/2014 | Klein | ................ | G01C 21/3697 705/14.25 |
| 9,146,129 B1* | 9/2015 | Furio | ................ | G01C 21/3682 |
| 2003/0036848 A1* | 2/2003 | Sheha et al. | ................ | 701/209 |
| 2007/0224938 A1* | 9/2007 | Jung et al. | ................ | 340/426.11 |
| 2009/0240427 A1* | 9/2009 | Siereveld et al. | ................ | 701/201 |
| 2010/0094550 A1* | 4/2010 | Tsurutome | ......... | G01C 21/3415 701/533 |
| 2011/0112908 A1* | 5/2011 | Rowley | ............. | G01C 21/3617 701/532 |
| 2012/0036014 A1* | 2/2012 | Sunkada | ................ | G06Q 30/02 705/14.54 |
| 2012/0054028 A1* | 3/2012 | Tengler et al. | ................ | 701/438 |
| 2013/0060635 A1* | 3/2013 | Walker et al. | ............. | 705/14.58 |
| 2013/0238239 A1* | 9/2013 | Rowley | ............. | G01C 21/3617 701/533 |
| 2013/0265857 A1 | 10/2013 | Foulds et al. | | |
| 2014/0335897 A1* | 11/2014 | Clem | ................ | G08G 1/0112 455/456.3 |
| 2015/0106011 A1* | 4/2015 | Nesbitt | ........................ | 701/412 |

FOREIGN PATENT DOCUMENTS

DE 102012020900 A1 * 4/2013 ............ H04W 12/06
JP 2015063875 A * 4/2015

OTHER PUBLICATIONS

Okada Hiroki, Machine Translation of JP 2015063875 A, Apr. 2015, espacenet.com.*
Streichert Thilo, Machine Translation of DE 102012020900 A1, Apr. 2013, espacenet.com.*

* cited by examiner

Primary Examiner — John Olszewski
Assistant Examiner — David P. Merlino
(74) Attorney, Agent, or Firm — Haynes and Boone, LLP

(57) ABSTRACT

Transport communication comprising, associating a wireless device and a user, associating a transport and the wireless device, determining a characteristic of the user based on at least one of a user search history and a user preference selection, determining a probable route the transport based on at least one of a route history and an input destination and ranking at least one suggestion of a route deviation based at least one of the determined probable route and determined characteristic.

16 Claims, 12 Drawing Sheets

|   | Characteristic | Type | Examples |
|---|---|---|---|
| 1 | Appointments | Date/Time | Today 2:00pm - 4:00pm meeting |
| 2 | Free Time | Time | 3.5 hours |
| 3 | Hobbies | List/Text | Woodworking, Piano |
| 4 | Stores Favored | List/Text | Hobby Lobby, Best Buy, Macys |
| 5 | Sports | List/Text | Baseball, Soccer |
| 6 | Driving Preferences | Choice/Text | Scenic/Shortest / Less Traffic |
| 7 | Driving Preferences/ Toll Roads | Choice/Text | Yes/No |
| 8 | Websites | List/Text | amazon.com, cnn.com, facebook.com |
| 9 | Entertainment Type | List/Text | Television sitcoms, Action movies, fiction books, technology magazines |
| 10 | Music Genre | List/Text | Hard Rock, Acoustic Jazz, Country Pop |

Fig. 4

TRANSPORT COMMUNICATION

CROSS-REFERENCE TO RELATED APPLICATIONS

The present application is related to U.S. patent application Ser. No. 14/155,488, Issued U.S. Pat. No. 8,843,317B1 entitled TRANSPORT COMMUNICATION PAIRING which is incorporated by reference herein in its entirety and filed on even date herewith.

FIELD

This disclosure relates to an apparatus, non-transitory computer readable media and method of transport communication, and more particularly to communicating with a wireless device, based at least on a transport data and a user characteristic.

BACKGROUND

Conventionally, users utilizing a wireless device in a transport operate independently and do not access and integrate data from both the wireless device and transport to modify transport destinations or recommendations.

SUMMARY

In one embodiment, a method comprises at least one of: associating at least one wireless device and at least one user, associating at least one transport and said at least one wireless device, determining at least one characteristic of said at least one user based on at least one of at least one user search history and at least one user preference selection, determining at least one probable route of said at least one transport based on at least one of at least one route history and at least one input destination and ranking at least one suggestion of at least one route deviation based at least on said determined at least one probable route and determined at least one characteristic.

In another embodiment, an apparatus comprises at least one of: a processor configured to associate at least one wireless device and at least one user, associate at least one transport and said at least one wireless device, determine at least one characteristic of said at least one user based on at least one of at least one user search history and at least one user preference selection, determine at least one probable route of said at least one transport based on at least one of at least one route history and at least one input destination and rank at least one suggestion of at least one route deviation based at least on said determined at least one probable route and determined at least one characteristic.

In a further embodiment, a non-transitory computer readable storage medium configured to store instructions that when executed causes a processor to perform at least one of: associating at least one wireless device and at least one user, associating at least one transport and said at least one wireless device, determining at least one characteristic of said at least one user based on at least one of at least one user search history and at least one user preference selection, determining at least one probable route of said at least one transport based on at least one of at least one route history and at least one input destination and ranking at least one suggestion of at least one route deviation based at least on said determined at least one probable route and determined at least one characteristic.

BRIEF DESCRIPTION OF THE DRAWINGS

FIG. 4 illustrates a table of database entries, in accordance to one embodiment of the disclosure, in accordance with one embodiment of the disclosure.

DETAILED DESCRIPTION

Figure 1:
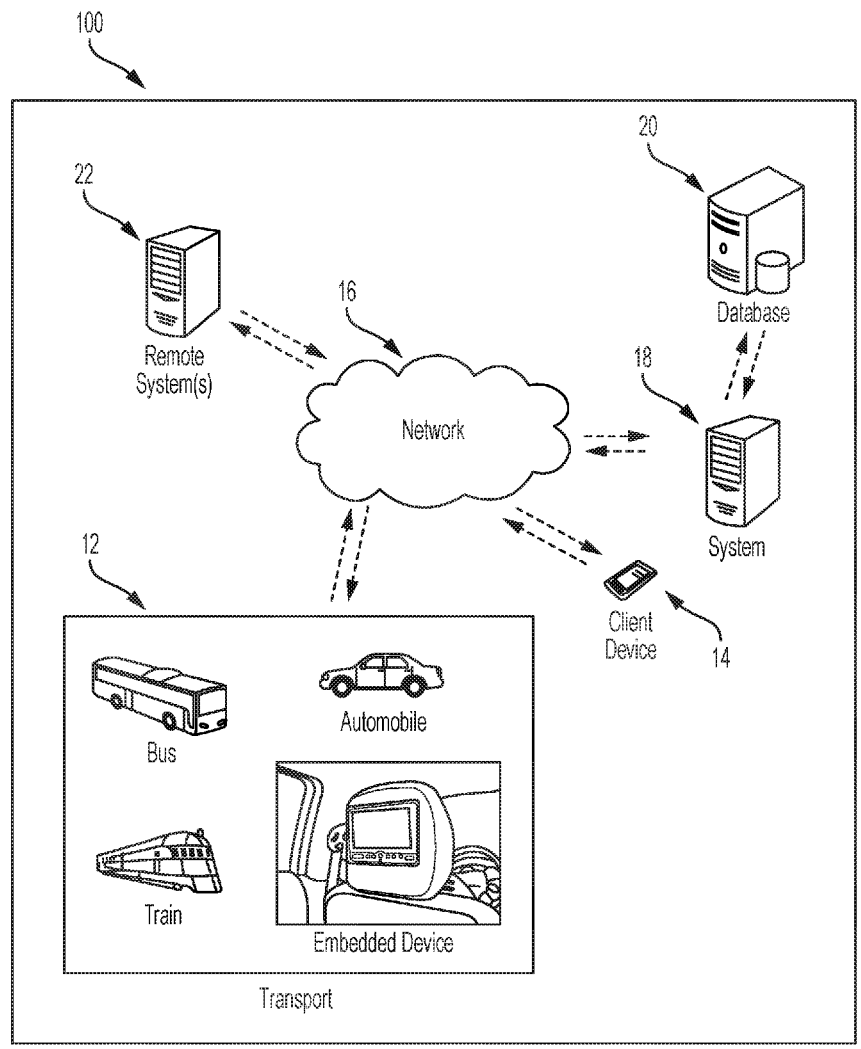
FIG. 1 illustrates an example transport communication system diagram, in accordance with one embodiment of the disclosure.

It will be readily understood that the components of the present disclosure, as generally described and illustrated in the figures herein, may be arranged and designed in a wide variety of different configurations. Thus, the following detailed description of the examples of a method, apparatus, and system, as represented in the attached figures, is not intended to limit the scope of the disclosure as claimed, but is merely representative of selected examples of the disclosure.

The features, structures, or characteristics of the disclosure described throughout this specification may be combined in any suitable manner in one or more examples. For example, the usage of the phrases "examples", "some examples", or other similar language, throughout this specification refers to the fact that a particular feature, structure, or characteristic described in connection with the example may be included in at least one example of the present disclosure. Thus, appearances of the phrases "examples", "in some examples", "in other examples", or other similar language, throughout this specification do not necessarily all refer to the same group of examples, and the described features, structures, or characteristics may be combined in any suitable manner in one or more examples.

Example examples provide a wireless user device. The device may be a computer, laptop, mobile, wireless or cellular phone, a PDA, a tablet, a client a server or any device that contains a processor and/or memory, whether that processor or memory performs a function related to an example. The present disclosure may work with any device, such as a personal computer with a touch screen, a laptop with a touch screen, a personal computing tablet, a smartphone or any device with a processor, memory and a touch screen.

The current disclosure allows interaction between a user device (such as a wired and/or wireless device) and a transport wherein a transport can be a car, bus, subway, train, motorcycle, bicycle, boat, plane, spaceship, submarine, or any other object that can transport a human being and/or goods.

This interaction is intuitive in nature due to the transports', processor(s) and/or memory(ies) on the transport or off the transport and in communication with the transport, having knowledge of one or more of the passengers' or the user's interests, schedule, etc. and/or through specific knowledge of one or more of the transport's data stored which may be stored in at least on of: on the transport, on a device embedded in the transport, on a device used in the transport, and off of the transport (such as in the cloud).

The application, as referenced to in the current disclosure, resides on or in communication with the user's transport. The transport is considered a connected transport if it is a transport that is equipped with Internet access, including with a wireless local area Network (LAN). This application allows the transport to share Internet access to devices both inside and outside of the transport. Often, the transport is also equipped with special technologies that provide additional functionalities to the user(s) of the transport. Increasingly, connected transports are taking advantage of the use of smartphones, and applications (apps) are available to interact with the car from any distance through the use of the Internet. Users are able to send remote signals from the Internet to unlock their cars, check the status of elements of the transport, find the location of the transport, remotely activate the climate control system of the transport, etc.

Interaction between a transport and a user can occur for various reasons. The transport, aware of specific aspects of the user, can offer suggestions according to various aspects of the trip to a given destination. For example, provide locations to the user that the user may find interesting and otherwise not be aware of.

The attention state of the user is calculated as determined by the amount of attention the user should have according to the current state of the transport.

FIG. 1 depicts, in one example, a diagram of the present disclosure. The present disclosure allows a user utilizing an application currently executing on a Transport 12 and/or a wireless device 14.

The Device 14 may be a mobile device or a more traditional computer such as a desktop, laptop, or may be a tablet computer, eBook reading device, mp3 player or any such device with a processor, memory and display. The application (in the form of software, for example) may be downloaded from the System 18 through the Network 16 or that currently resides on the Transport and/or Device 12/14.

The elements in the system may include fewer or greater components or different components, such as wired or wireless electronic devices such as clients, servers, phones, tablets and computers as well as various Networks such as the Internet, intranets and public and private Networks, without departing from the scope of the present disclosure.

The Transport and Device 12/14 is connected to the Network 16. It should be noted that other types of devices, in addition to devices 12/14, might be used with the present disclosure. For example, a PDA, a tablet computer, a laptop, an MP3 player, a gaming device (such as a hand held system or home based system) and the like (including a P.C. or other wired device) that can also transmit and receive information could be used with the present disclosure.

The user of the application will interface with the Transport and/or Device 12/14 and connect through the Network 16 to the System 18. The System 18 can be redundant, or be more than an entity without deviating from the scope of the disclosure. A database 20 is directly connected to the system or connected remotely through the Network 16 without deviating from the scope of the disclosure.

The application resides completely or partially on the Transport and/or the Device 12/14 which can be a transport and/or a mobile device, and can also reside on a user's desktop computer, a personal digital assistant (PDA), tablet computer, or any other device containing a processor, memory, and an operating system. In addition, the application can reside on either completely or partially on any one of the other elements in the system depicted in FIG. 1; for example, the System 18, the Database 20, and/or the Network 16. A database 20 is directly connected to the system 18, can be a part of (co-located with the system 18) or connected remotely through the Network 16 without deviating from the scope of the disclosure. Also present may be one or more Remote System(s) 22 connected through the Network 16. These remote systems may provide additional remote databases allowing access to more data through the Network 16. If the application resides on a Transport and/or a Device 12/14, the application can be downloaded through a platform (such as an application store or market) residing on the device or accessed via the device.

The user interacts with the application executing on the Transport and/or the Device 12/14 via a pointing device, a computer keyboard, finger, hand, gesture, speech, eye or iris control or any other commonly used input devices. Any of these terms used herein can refer to one another.

The current disclosure may work with any device such as a personal computer with a touch screen, a laptop with a touch screen, a personal computing tablet, a smartphone or any device with a processor, memory and a screen including a touch screen.

Data that is utilized for applications is no longer exclusively stored on the same device executing the application (and certainly may be). The data can be stored remotely, or on the cloud (i.e. accessed and stored via and/or in the Network 16, which may be the Internet, or other data Network, not shown). In this configuration and this particular example, this data does not reside on a particular device, and resides external to the device. The data is obtained by a connection to the Network 16. As the separation of the application and its associated data grows, more and more applications store the associated data in the cloud, allowing access to data that is stored remotely through the connection to the Network 16. A benefit of this is that the same data is available on every device used.

By obtaining data through the cloud, a transport can determine certain intuitive observations that are depicted in detail below. This document serves to functionally examine particular scenarios to give the reader an overall understanding of the inherent functionality introduced through the current disclosure. Other intuitive applications can utilize a similar approach to the functionality introduced herein without deviating from the scope of the current disclosure.

Today, more and more applications are utilizing the cloud (or the Network 16) to store data pertaining to a user and/or a device. These applications allow the storing and retrieval of any amount of data at any time with worldwide access. Application Programming Interfaces (APIs) are published wherein developers can obtain methods and procedures to take advantage of reliable and fast Networking infrastructure to perform data operations in a secure and cost effective manner.

Elements of cloud storage can consist of:
Projects: Data in the cloud storage exists inside a project. A project consists of a set of users, a set of APIs, billing, authentication and monitoring settings for the APIs.
Buckets: Buckets are the most basic element to hold data. Buckets can be utilized to organize data as well as control access to the data. Buckets belong to a project and they cannot be shared across projects.
Objects: Objects are individual elements of data that are stored in the cloud. They have two components: the object data and the object metadata. The object data component is usually a file that is stored in the cloud. The object metadata is a collection of elements in the form of [name-value] that describes the qualities of the objects. Objects belong to a bucket and cannot be shared among buckets.

Cloud storage provides functionalities and capabilities making storing, sharing and managing data efficient and reliable. Data can be terabytes in size. Cloud storage provides strong read-after-write consistency for upload and deletion operations. This means that after an object is successfully uploaded, you can download it immediately, delete it, or get access to its metadata. Once propagation through the Network 16, list operations are eventually consistent from anywhere. Furthermore, by configuring the APIs, access to the data's objects and buckets are controlled. Data can be shared with the entire world, a particular group, by a specific domain, or users' with particular accounts.

The current disclosure relies on the storage of data in the cloud, and the transport and users device(s) having access to this data.

The more intuitive element of the current disclosure is based on the fact that the Transport 12 and/or the Device 14 understand certain aspects of the user. An understanding is accomplished by the Transport 12 and/or the Device 14 obtaining access to the cloud, thereby obtaining access to the System 18 and/or the Remote Systems 22 through the Network 16. The System and/or Remote Systems 22 collect and store certain information related to the user when interacting with devices that are connected to the cloud. The application attempts to determine the user's personal interests by examining any of the following, but not limited to the following:

ads that have been served to the user's and/or user's device such as an email program
ads that the user accessed (such as lingered over, clicked on, etc.)
searches requested
web sites visited
groups that the user is a member of
emails that the user sent or received
calendar events that the user is subscribed to
Web surfing history
previous and current location of the user
time that certain actions occur
online games that the user has shown interest in
DVR (videos recorded and/or scheduled)
live video streaming/IPTV
web based shows
GPS (Cellular)
IP and/or mobile device call records
other data that a Remote System 22 may collect and provide access to via APIs Among the various means to determine the interests of a given user, one of the beneficial methods is examining the user's search history. This search history is located in the user's computer (i.e. desktop, laptop, mobile device, or any other device that contains a memory and processor, which is connected to the Network 16. Examining the user's Web searching history provides a window into what the user is interested in through an understanding how the user has utilized the Internet in the past.

When searching the Internet, the user will utilize a web browser regardless of the device being accessed. Upon visiting a website (or navigating to a Uniform Resource Locator (URL)), a small amount of data will be stored on the user's device called a cookie. A cookie, also known as an HTTP cookie, web cookie, or browser cookie, is a small piece of data sent from a website and stored in a user's web browser while a user is browsing a website. When the user browses the same website in the future, the data stored in the cookie is sent back to the website by the browser to notify the website of the user's previous activity. Cookies were designed to be a reliable mechanism for websites to remember the state of the website or activity the user had taken in the past. This can include clicking particular buttons, logging in, or a record of which pages were visited by the user.

Figure 2:
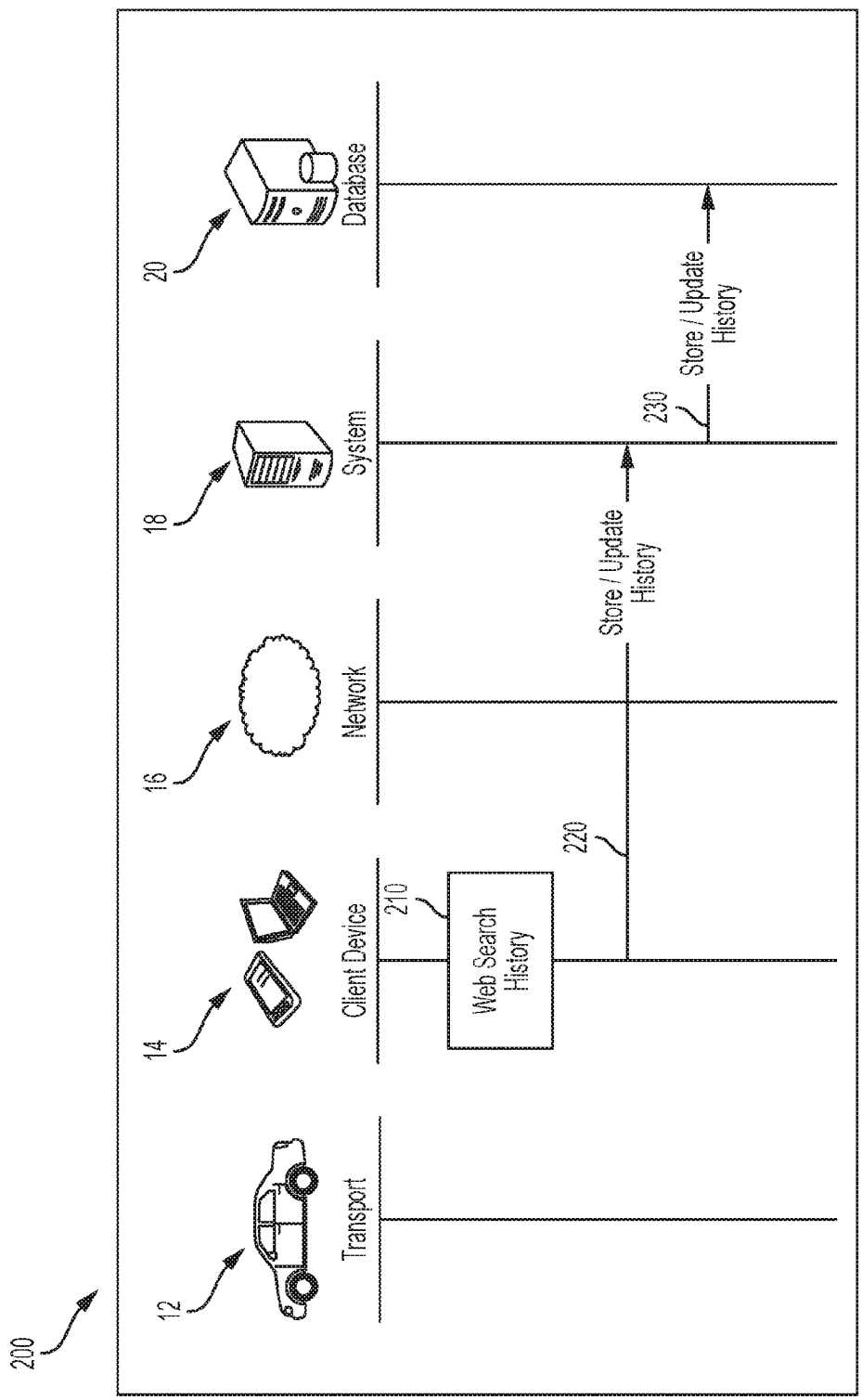
FIG. 2 illustrates an example software message diagram for storing search history in the system, in accordance with one embodiment of the disclosure.

FIG. 2 shows the message flow of the Device 14 and additional wireless device 22 storing the user's web searching in the Database 20. Each of the User's Devices 14 and additional wireless device 22 contains the web search on the device in small data files, for example cookies 210. The application of the current disclosure sends the history to the System 18, sending the message Store/Update History 220. This message is sent on a regular interval configured by the application of the current disclosure (not depicted) allowing the System 18 and/or the Database 20 with the latest web search history. This message is routed through the Network 16 to the System 18. The System 18 calls an Add method to add the data to the Database 20 where the data is stored 20 (in one example) 230. Multiple Add messages may be necessary to allow the history to be stored in the Database 20.

In one example, the System 18 is utilized to examine the data stored in the Database 20. The System 18 performs queries on the Database 20 to determine specific reoccurring data, for example, the user's hobbies.

Figure 3:
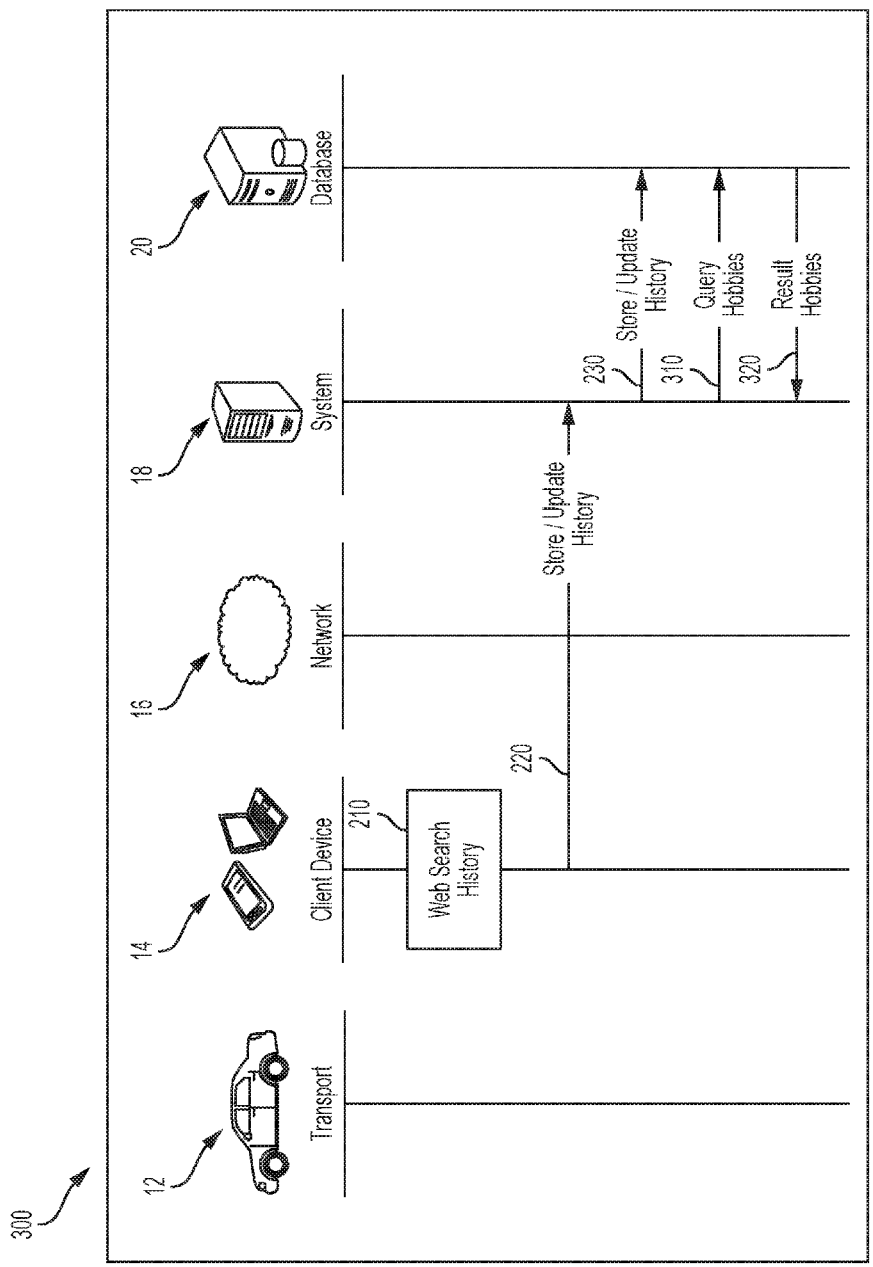
FIG. 3 illustrates an example software message diagram for determining a user's hobbies, in accordance with one embodiment of the disclosure.

FIG. 3 shows the message flow of the System 18 determining the hobbies of the user. In this scenario, the System 18 sends one or more Query Hobbies message 310. This message may be an SQL Query message if the database is an SQL database (in one example). The message contains a list of text elements containing the names of hobbies that the System 18 is seeking. The Query Hobbies message 310 is sent to the Database wherein the Database traverses through the user's data seeking the list of words in the Query Hobbies message 310. The matches are returned in the Result Hobbies message 320. The System 18 arranges the results returned in the Result Hobbies message 320 in a hierarchal manner. Finally, the actual hobbies are determined according to the number of matches returned in the Result Hobbies message 320.

In other examples, other methods can be employed to gain an understanding of the user's previous Internet surfing history. Various companies, for instance, offer free services that users can utilize to perform email capabilities, manage groups, search the web, manage advertisements, manage calendar activities, manage documents, as well as many other services. Data associated with these services can be interworked with the current disclosure to aid in determining the interests of the user by sending this data to the System 18 and finally the Database 20 utilizing similar methods and procedures depicted in FIG. 2.

The System 18 processes the details of the Transport and/or the Device 12/14 and additional wireless device 22, and retains access to the connected Database 20. As such, the Transport and/or the Device 14 are in communication with the System 18 allowing the System to intuitively make suggestions through the Transport and/or the Device 12/14 and additional wireless device 22, for example.

In one example, the Transport and/or the Device 12/14 communicates with the System 18 in one or more of the following instances:
1. When the User utilizes the Transport and/or Device 12/14 without any specified destination
2. When the User specifies a destination through the application of the current disclosure
3. When another user utilizes the Transport and/or the Device 12/14

In the first scenario above, the Transport and/or the Device 12/14 communicate with the System 18 wherein the Transport and/or the Device 12/14 may send information to the System 18 and/or the System 18 may send information to the Transport and/or Device 12/14. This may occur when the user is traveling to a destination.

The communication sent from the System 18 to the Transport and/or Device 12/14 contains information that may be of interest to the user of the current disclosure, nonetheless, information that is not requested. The current disclosure allows for the System 18 to have the insight through:
methods discussed in determining the characteristics of the user,
access to both the Database 20 and the Remote System(s) 22, and
an understanding of the details of the travel of the user of the current disclosure, allowing each to communicate intuitively.

In the second scenario above, the application residing on the Transport and/or Device 12/14 attempts to communicate with the System 18 when the user of the current disclosure specifically enters a destination into the application. For example, when the user is on a lengthy trip to a destination.

In the third scenario, the application residing on the Transport and/or the Device 12/14 may communicate with the System 18 without the interaction of the user's data. This information may be limited in comparison to obtaining the full user's data, nevertheless the System may still communicate with the Transport and/or the Device 12/14.

In another example, the user of the application of the current disclosure enters configuration data into a form, henceforth referred to the configuration module of the application. This configuration module may be part of the application of the current disclosure executing on either the Transport 12 and/or the Device 14. The configuration module assists with configuring the System 18 with the defaults and preferences of the user, allowing the System 18 to more intuitively correspond with the user.

FIG. 4 depicts some of the possible User data that is stored in the Database 20. More, less, and/or different types and categories of data can be determined as useful without deviating from the scope of the current disclosure.

The System 18 builds data from the user by accessing data that the user has made available through pre-authorization at the application's initiation. This deep recording of data allows the System 18 to offer intuitive interactions to the user when utilizing the Transport and/or the Device 12/14.

The Database 20 stores data from many, possibly disparate sources. The user may utilize various scheduling programs. For example, scheduling applications are available on mobile devices, which can store the scheduling information in remote databases. Also, many online services offer calendar applications that are, in their nature, cloud services.

For the first item, the system determines when the user's next appointment schedule is, from the current time. Many calendar applications that are cloud-based allow a user to share the calendar and scheduling data with a 3rd party. Through this functionality or another environment wherein the data is uploaded to a Remote Server 22 and published APIs allow interactions to query the stored data, the user's schedule is obtained. The system queries the schedule data as necessary to determine the appointments of the user.

For the second item, the System 18 queries the Database to determine the amount of time until the user's next scheduled appointment. The user's schedule is sync'd with the System 18 and the Database 20. The application calculates the amount of time between the current time, and the next scheduled appointment.

For the third item, the user's hobbies are calculated. The user's hobbies are of interest as it allows the system to determine the possible interest level in various scenarios. Understanding the user's hobbies will help the System 18 to determine if there may be interest in a store that may be related to the user's hobby and/or that is offering a bargain near to where the user is located. For example, if the items on sale match a user's hobby, there is a greater chance that the user may be interested in going to that store.

The System 18 can obtain the hobbies of the user by an examination of the groups that the user is a part of, analyzing the emails looking for keywords associated with a particular hobby, examining online purchase of the user, or any other methods included in the this specification.

For the fourth item, the favored stores are listed. These are stores that the user regularly visits or that the user has indicated as favorites.

In one example, the user's favorite stores are determined by any stores that the user has bookmarked on the Device 14. This data is sent to the System 18 and finally stored in the Database 20 in the same manner as depicted in FIG. 2.

In another example, the favorite stores are determined by analyzing the geographic history of the user's movements. If the user regularly visits a business, then that store would be listed in the favored list. The location history of the Device 14 can be stored by online applications that regularly store the historical location of the device in Remote Systems 22. This data contains a history of the user' geographic locations.

Figure 5:
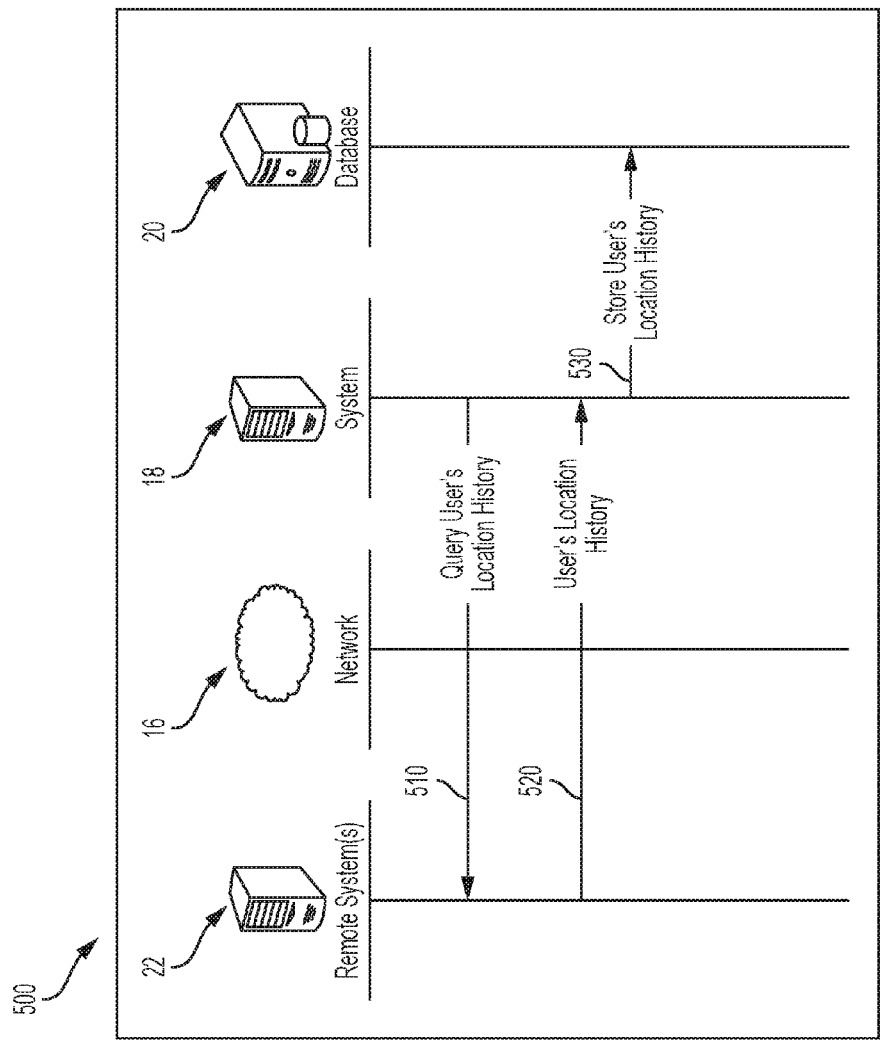
FIG. 5 illustrates an example software message diagram for storing user location history, in accordance with one embodiment of the disclosure.

FIG. 5 shows a message flow of the querying of the historical data, and the corresponding storing of said data in to the Database 20 500. The System 18 queries the Remote System(s) by sending a Query User's Location History message 510 through the Network 16 to the Remote System(s) 22. This message contains the necessary items according to the published APIs of the Remote System(s) 22. The Remote System(s) 22 return the historical geographic data of the user in the User's Location History message 520, which is sent through the Network 16 to the System 18. The System 18 stores this data in the Database 20 by sending a Store User's Location History message 530. The Store User's Location History message 530 can be a SQL ADD message wherein the Database is a SQL Database, for example.

In another example, the historical web search queries performed by the user can be utilized to determine businesses where the user has sought information of the business, for example the store hours. Also, by examining the phone records of the user's IP and/or mobile device phone records, the System determines the stores that have a high interest of the user.

For the fifth item, the interested sports are listed. These are sports wherein the user has a high interest. For example, the System 18 can scan the user's data (for example emails, phone records, groups, etc.) and record the names of sports found. A hierarchal list of instances of sports names is made and the top X number of sports names are listed. This data is obtained by querying one or more of the Device(s) 14, the Remote System(s), and/or any other element in the System Diagram. The System 18 collects this data in manners similar to depicted flowcharts: FIG. 2 and/or FIG. 5.

The list of sports will help the System 18 determine the interest level of the user for specific scenarios pertaining to a sport. For example, the System 18 can scan the user's data (for example emails, phone records, groups, etc) and record the names of sports found. A hierarchal list of instances of sports names is made and the top X number of sports names are listed. This data is obtained by querying one or more of the Device(s) 14, the Remote System(s), and/or any other element in the System Diagram. The System 18 collects this data in manners similar to depicted flowcharts: FIG. 2 and/or FIG. 5. For example, gauging the interest that a user may have in a store, or a possibly nearby sporting event that the user may not be aware of and would be highly interested in if the System 18 brought it to the user's attention.

For the sixth item, the preferences of the driver are listed. This preference list may be determined by allowing the user to enter the data at configuration of the application.

Knowing the driving preferences of the user allows the system to bring to the user's attention an alternate route to a destination that may match the user's driving preferences. The driving preferences are obtained when the user enters the preferences at the configuration procedure of the application of the current disclosure. The user has the option to enter the driving preferences by selecting from the choices offered in the GUI of the configuration part of the application.

For example, there may be an alternate route to a destination that includes historic sites, or lookout sites wherein the user may be highly interested. The Transport and/or the Device 12/14 then communicates to the user of the alternate route available, along with the reason that the user may be interested in the alternate route. The user will then be able to respond by asking for more information and the Transport 12 can query the System 18 for more information and make this available to the user.

In the seventh item, the user is able to provide the driving preferences allowing the Transport and/or the Device 12/14 to offer better routes that are closer to the preferences of the user. This data may be entered into the system by the user at configuration of the application. Knowing the driving preferences allows the Transport and/or the Device 12/14 to match the preferences of the user at a more intuitive level.

The Transport and/or the Device 12/14 are a Connected Transport thereby having access to the cloud (or the Network 16). This connection allows the user to obtain specific data about the user, giving the application executing in the transport intuitive insight.

For example, a user of the current disclosure may be traveling to a given location. This destination is stored in the cloud and therefore is available to the transport.

Figure 6:
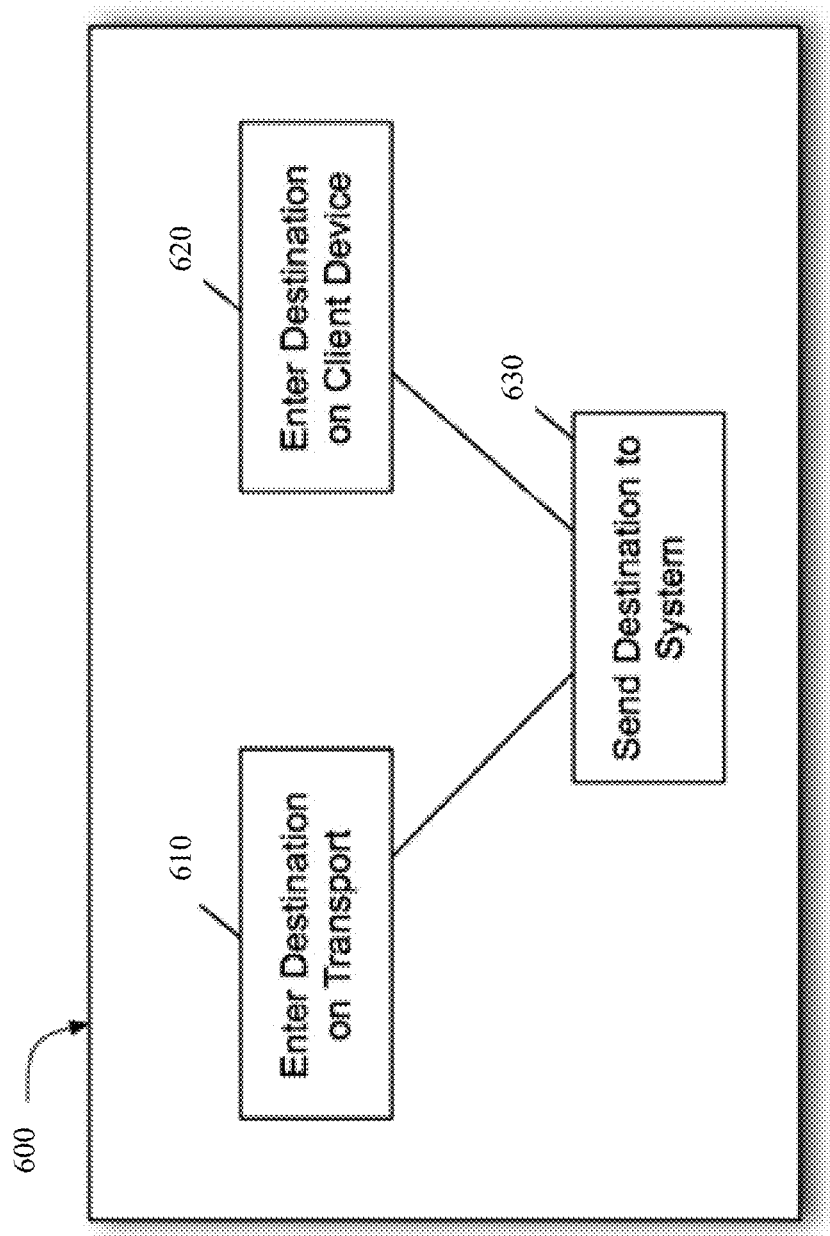
FIG. 6 illustrates sending destination history to the cloud, in accordance with one embodiment of the disclosure.

FIG. 6 depicts a flowchart showing the destination input by the user being sent to the cloud 600. There are two scenarios wherein the destination can be input into the application: on the Transport 12 610, or on the Device 14 620. In either case, the destination is sent to the Cloud, or more specifically, to the System 18 630. This information is sent first to the Network 16, and then routed to the system 18. The system also stores the destination address in the database 20 if deemed necessary, in some examples.

As the user travels, the transport has details of the specific geographic location of the transport by obtaining the GPS data from the System 18 or internal to the transport. The current location of the Transport 12 and/or the Device 14 is sent through the Network 16, and stored in the System 18 and/or the Database 20 in a manner similar to the destination as depicted above.

Figure 7:
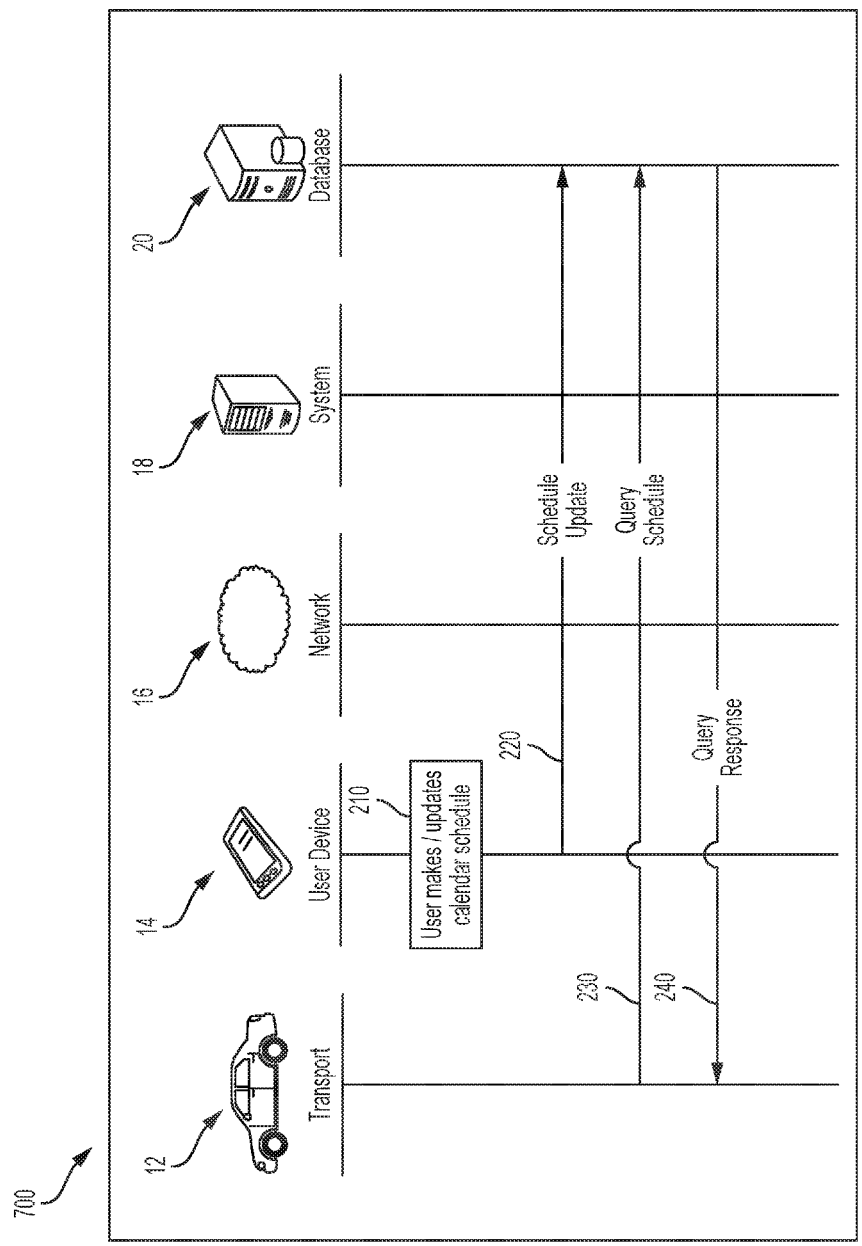
FIG. 7 illustrates accessing scheduling information from the cloud, in accordance with one embodiment of the disclosure.

FIG. 7 shows an implementation 700 of the current disclosure in one example. In this scenario, the user's scheduling information is uploaded to the cloud, available for the devices that the user may utilize. In this example, the user's scheduling information is uploaded to the Database 20.

Having the data in the cloud, devices that have the proper authentication are able to have access to the data, making intuitive interactions. In this scenario, the Transport obtains access to the user's scheduling information 210. The User's Device 14 synchronizes the scheduling information on the device with the cloud. In this scenario, both the System 18 and the Database 20 represent the cloud. A Schedule Update message 220 is represented to reflect the synchronization of the user's scheduling information. This message is propagated through the Network 16 and through the System 18, and finally written into the Database 20. This synchronization of the User's Data is made when the change is made to the scheduling information regardless of where the user is geographically located. The device must retain Internet access for the synchronization to occur. In cases where there is no Internet access, the synchronization will occur when the user obtains Internet access by utilizing the protocol that the user is utilizing for cloud storage.

The transport queries the user's schedule by sending a Query Schedule message 230 that is propagated through the Network 16 and through the System 18, and finally the Database 20 is queried.

The response to the query is sent in response 240, giving the Transport 12 the up-to-date knowledge of the user's schedule. This scheduling information can be obtained for particular timeframe, for example the day, the week, the month, etc.

Furthermore in this scenario, the user is in the transport that is an element in the system of the current disclosure. The transport, knowing the destination of the trip, is also aware of specific information from businesses local to where the transport is currently located.

The ability to obtain data of stores that are offering bargains exists in applications widely available. For example, applications are available that show bargains with respect to where the user is geographically. These applications allow the user to search by location, by keyword and by category (including Clothing & Apparel, Furniture, Health & Beauty, Sports & Fitness, Toys and more). These results are displayed in a map that is made available on the user's device. The application also shows how far the user is from the business offering the bargain(s).

The System 18, knowing the current location of the user in the Transport 12, can attempt to locate business that are currently offering sales that may be of interest to the user.

The System 18 can query the stores that may be of interest to the user by using both the hobbies of the user as well as stores of the user that have been previously stored in the Database 20. The published sales of the stores are regularly published to the Internet. By matching the sales of the stores with what the hobbies of the user is, as well as stores where the user usually shops, the System brings this information to the Transport and/or the Device 12 allowing the information to be presented to the user (for example, via text, verbally, or through a speech or multi-media announcement). The user would then be able to confirm the change in the destination to the store, or reject the change and continue to the original destination.

The System 18 regularly informs the Transport and/or the Device 12/14 of information that may be of interest, knowing the current geographical location of the Transport and/or the Device 12/14. This is functionally communicated by the System sending an Information message to the Transport. This Information message contains any necessary information to make the Transport aware of messages that would be of high interest to the user.

This interaction with the data of businesses is obtained from Remote Systems 22 communicated with through the Network 16. These Remote Systems 22 are systems in place that offer APIs available to developers allowing querying of data regarding sales and discount purchase opportunities.

Figure 8:
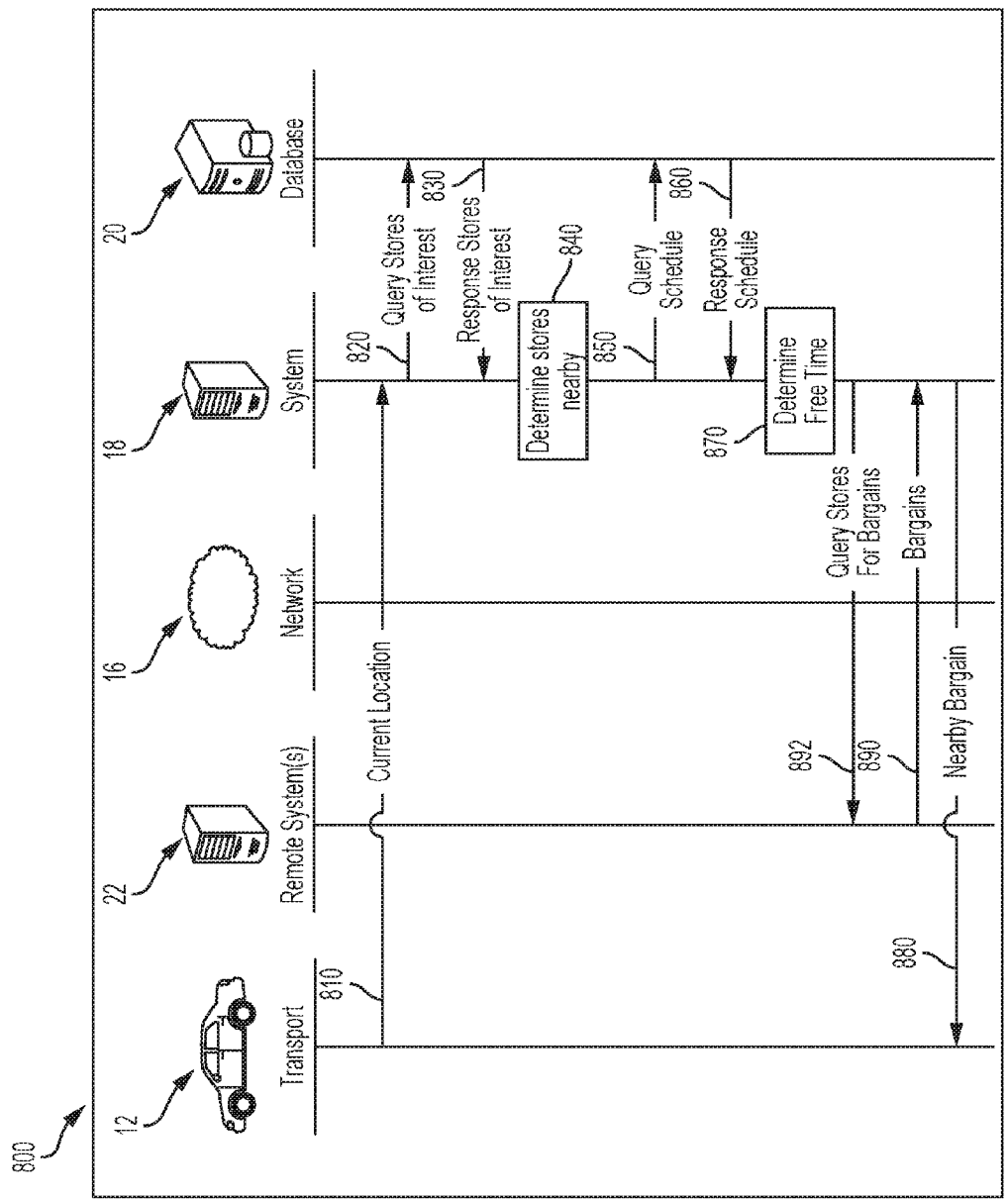
FIG. 8 illustrates an example software message diagram for determining nearby bargains, in accordance with one embodiment of the disclosure.

FIG. 8 depicts a message flow wherein the Transport 12 receives a message from the System 18 detailing stores near where the Transport 12 is currently located that are currently offering bargains. The message also contains the amount of free time of the user according to the user's schedule 800.

The flow begins with the Transport 12 sending the current geographic location in a Current Location message 810. This message is sent to the Network 16 and routed to the System 18.

Upon reception of this message, the System 18 queries the Database 20 to obtain a list of stores that may be of interest to the user. A Query Stores of Interest message 820 is sent to the Database 20. This message may be a structured query message, according to the particular implementation of the database.

The Database 20 responds with a Response Stores of Interest message 830. This message may be an automatic response to the query message according to the particular implementation of the database. This message may also be one of many responses according to the particular implementation of the database. This message contains a list of interesting stores according to one or more of the following elements of the user:

Hobbies
Sports
Groups
Interests

Having a list of stores of interest to the user, the System 18 utilizes the current geographic location of the Transport 12 to determine a list of stores of interest in the geographic location of the Transport 12 840. The amount of distance between the Transport 12 and the located store is configurable through the configuration functionality of the application. For example, the choices of distance are 1 mile, 5 miles, and 10 miles.

In another example, the distance between the Transport and the store is calculated by time, taking into consideration the current traffic pattern. Current map applications allow the calculation of the time to locations taking into consideration the current traffic pattern.

The System 18 queries the Database 20 to determine the amount of free time according to the user's current schedule by sending a Query Schedule message 850 to the Database 20. This message may be a structured query message, according to the particular implementation of the database.

The Database 20 responds with a Response Schedule message 1360 sent back to the System 18. This message may be a structured query message, according to the particular implementation of the database.

The System then calculates the amount of free time the user has according to the schedule 870. The system sends a Query Stores For Bargains message 892 to the Remote System(s) 22. This message is sent to the Network 16 and routed to the Remote System(s) 22.

In one example, the message calls published 3rd party APIs wherein current bargains are returned for given stores.

In another example, the websites of the interested stores are queried.

The current bargains are returned to the System in a Bargains message 870. This message contains details of current sales ongoing at the store and may contain sales in particular departments of the store. The System parses through the sales and/or the sales in the particular departments to determine the interest in the stores bargains.

In another example, the amount of interest of the bargain is input by the user of the application at configuration time wherein the user is able to input the amount of bargain. For example, the configuration contains the following:

% of Sale for Interest—_____ %

The user is able to input a number in this configuration element that will help the System determine the interest in the store's current sales. If the current bargain is equal to or greater than the configuration element, then the store's bargain is made aware to the Transport 12.

Therefore, with this information pertaining to the user (stores of interest) as well as current bargains nearby, the System 18 brings to the user's attention the opportunity for the user to take advantage of a current, nearby bargain by sending a Nearby Bargain message 880 to the Transport 12. The message also includes the amount of free time according to the user's schedule helping the user to determine if there is enough time to travel to the business offering the bargain. The transport makes this aware to the user by announcing the following to the user:

There is a 40% off sale for hunting apparel at the Cabela's business located 3 miles from your current location. Your next appointment is 4 hours from now.

The system allows for interaction between the transport and the user. Therefore, the user can respond by texting or verbally responding the following:

1. Go there
2. Take me there
3. Any other sales nearby?
4. No
5. Give me more information
6. Purchase now
7. Pick up after purchase
8. Pick up later
9. Deliver home The responses above serve to exemplify possible responses offered by the user. One versed in programming can easily implement other similar responses without deviating from the scope of the current disclosure.

If the #1 or #2 responses are given, the Transport 12 alters the destination to the business offering the bargain by updating the destination to the System 18 by sending an Update Destination message to the System 18, or updating the internal GPS device internal to the Transport 12, or updating the Device 14.

If the #4 response is given, the application cancels the procedure and the current destination remains.

If the #3 or #5 responses are given, the system queries the Remote System(s) 22 by sending a More Information message to the System attempting to locate additional information that was not provided in the first interaction and relays it to the user in a Response More Information message. This may include store hours, store location, description of ongoing and/or upcoming sales, etc. This information can be obtained from the Remote System(s) 22 utilizing APIs specifically designed for interactions with shoppers. The Transport 12 communicates with The Remote System(s) through the Network 16. The Remote System(s) may have a connected and/or remote database utilized to store information about users.

If the #6 response is given, the user is given the ability to purchase an item online if available. In this scenario, the System 18 delivers a particular item on sale at a nearby store. The Bargains message 890 returns a specific item on sale from a store of interest (one of the stores in the list returned in the Response Stores of Interest message 830). This item is delivered in the Nearby Bargain message 880, and delivered to the Transport 12. For example, the following is delivered to the user in the Transport 12:

The Timber Ridge Split Decision Pack Combo is on sale at Cabela's store for $29.88 located 3 miles from your current location. Your next appointment is 4 hours from now.

Figure 9:
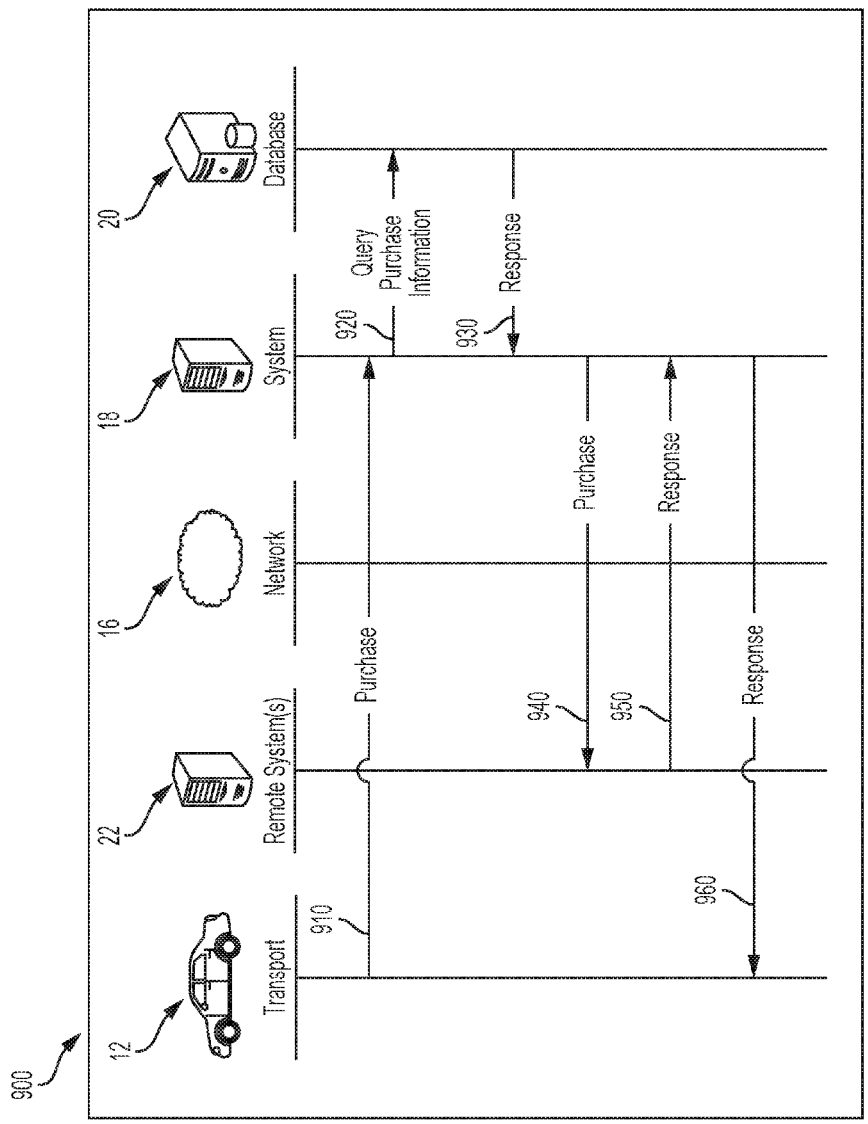
FIG. 9 illustrates an example software message diagram for purchasing an item, in accordance with one embodiment of the disclosure.

FIG. 9 is a message flow of the user initiating a purchase of an item 900 that has been delivered to the Transport 12 from the System 18. When the user responds via text input or speech of Purchase, the Transport 12 sends a Purchase message 910 to the System 18. This message is routed through the Network 16 to the System 18. Upon reception of the Purchase message 910, the System 18 queries the Database 20 for the method of payment by sending a Query Purchase Information message 920 to the Database 20. This message may be a structured query message, according to the particular implementation of the database.

In one example of the current disclosure, the method of payment is entered by the user at the configuration element of the application of the current disclosure. The method of payment can be a credit/debit card, a form of Internet payment, bank account information, or any other regularly utilized payment form regularly utilized for Internet purchases. This configuration of payment is stored in the System 18 by sending a message through the Network 16 to the System 18. The System 18 then stores the payment configuration in the Database 20. This message may be a structured query message, according to the particular implementation of the database.

The payment configuration is sent to the System 18 in the Response message 930. This message may be the response to a structured query message, according to the particular implementation of the database.

The System 18 sends a Purchase message 940 to a Remote System 22. This message may, in one example, interwork with published APIs available throughout the market. For example, current retailers are making available APIs that allow interworking with their Point Of Sale database(s) allowing functional interworking with the systems through adjacent applications.

For example, one large retailer has published a product entitled Commerce API, a platform that allows partners to conduct commerce within their e-commerce or web-based applications. ??Commerce API, combined with other APIs, provides developers and partners a rich set of capabilities including:

Access to over 1 million current and historical consumer technology products available through the organization.

Ability to check pricing, product availability by store, specifications, descriptions, images, and ratings & reviews Purchasing through a partner's e-commerce site or web-based application Product fulfillment through home delivery or in-store pick up.

Additionally, Commerce API gives you access to:??Flexible Fulfillment Options including In-store pickup, friends and family pickup, and finally ship to home.

Utilizing these APIs, the Purchase message 940 allows for the purchasing of the product, wherein the Remote System 22 responds with a Response message 950 sent back to the System 18. This response message contains the purchase response.

Finally, a Response message 960 is sent to the Transport 12 for a validation of the purchase, or details of the point of failure if the purchase was unable to be completed.

In another example of the current disclosure, the transport's window is used as a computer monitor to interact with the examples described above.

In this example, the non-driving user is able to interact with functionalities with the application, responding to the input from the System 18. The window displays the results from the System 18, and the user is able to respond to the data and make decisions that drive the direction of the logic in the application. The user may interface through the wireless device 26/28 and connect through the network 22 to the system 24. The system can be redundant, or may be more than an entity without deviating from the scope of the present disclosure. The wireless device 26, 28 and the system 24 will connect through the network 22 to one or a plurality of offsite systems 12, 14, 16, 18, 20 through the network 22.

Figure 10:
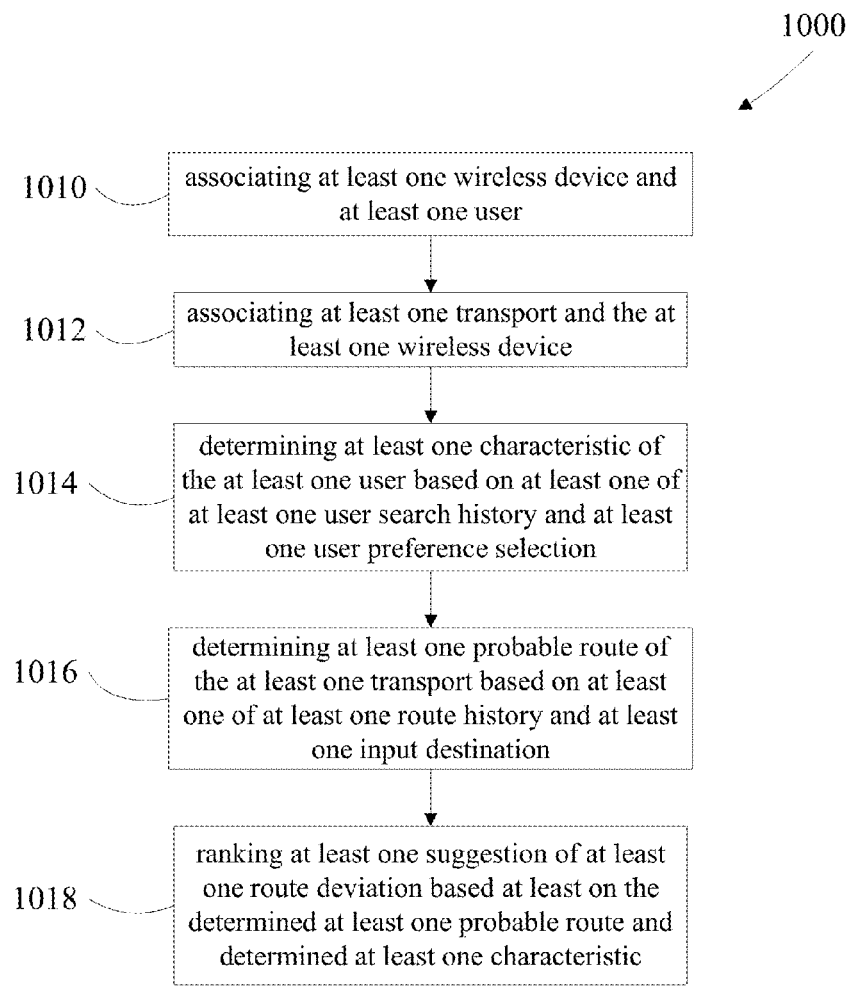
FIG. 10 illustrates an example flow diagram of an example method of operation, in accordance with one embodiment of the disclosure.

FIG. 10 illustrates an example flowchart of a method 1000, comprising associating 1010 at least one wireless device and at least one user, associating 1012 at least one transport and the at least one wireless device and determining 1014 at least one characteristic of the at least one user based on at least one of at least one user search history and at least one user preference selection. The method further comprises determining 1016 at least one probable route of the at least one transport based on at least one of at least one route history and at least one input destination and ranking 1018 at least one suggestion of at least one route deviation based at least on the determined at least one probable route and determined at least one characteristic.

In another example, In another example, the ranking may be sent to the wireless device via at least one of a short message service (SMS) format, a video format, an audio format, and wherein the plurality of computing devices comprise at least one of a smartphone, cell phone, tablet computing device, personal computer, and a laptop computer. The example may also include associating at least one additional wireless device to the at least one user, and wherein the at least one user search history is based at least on searches performed utilizing the at least one additional wireless device and predefining a delivery preference of the ranking, wherein the delivery preference comprises at least one of a SMS message delivery preference, an email message delivery preference, a phone call message delivery preference, and a voicemail message delivery preference.

The example may also comprise rating at least one suggestion of at least one route deviation based at least on the determined at least one characteristic of the at least one user and determined at least one probable route where the rating at least one suggestion of at least one route deviation is based upon a rating history of previous reviewers. Additionally the method may comprise recording at least one user search history, analyzing the search history to determine at least one of at least one user hobby, at least one user sport, at least one user group and at least one user interest and determining at least one user location. The method may also comprise storing the at least one input destination at the at least one wireless device, determining a routing schedule based on at least one of at least one route history and at least one input destination and determining at least one bargain routing based upon the at least one characteristic and at least one of at least one route history and at least one input destination.

Figure 11:
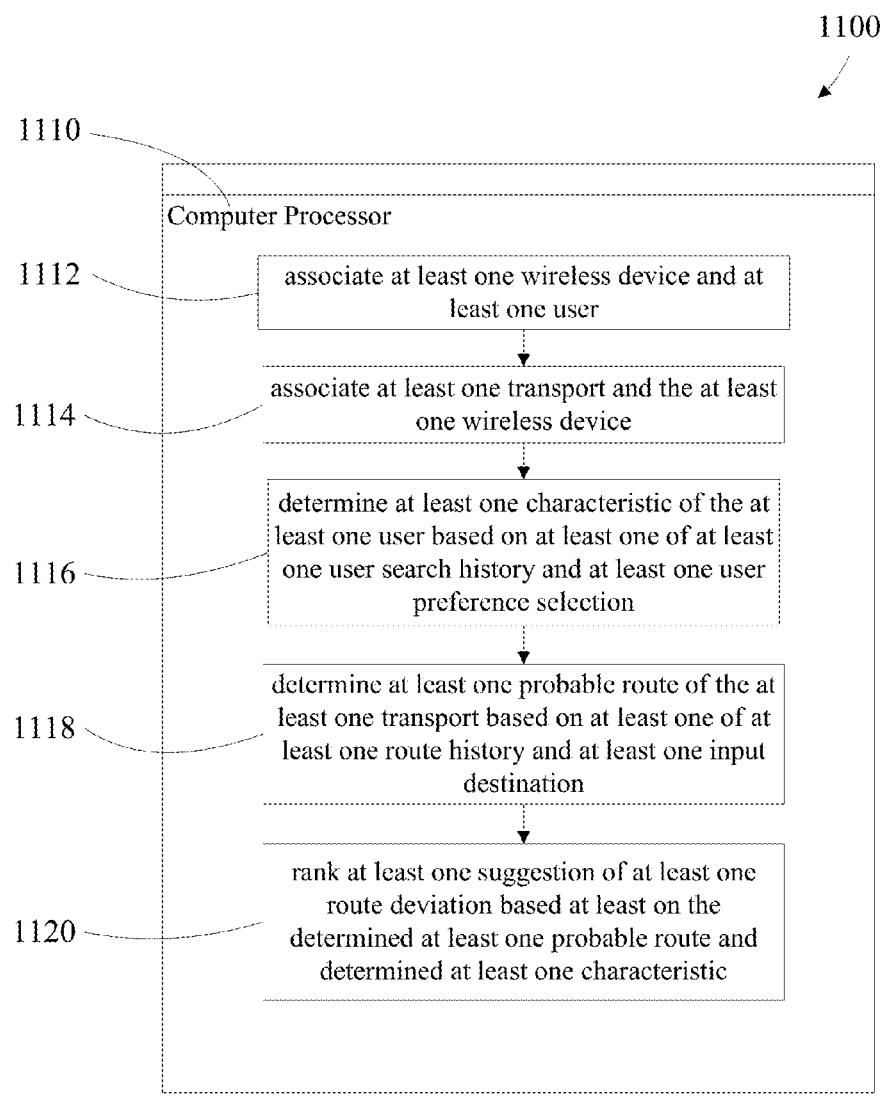
FIG. 11 illustrates another example flow diagram of an example method of operation of an apparatus, in accordance with one embodiment of the disclosure.

FIG. 11 illustrates an example of an apparatus 1100, comprising a processor 1110 configured to associate 1112 at least one wireless device and at least one user, associate 1114 at least one transport and the at least one wireless device and determine 1116 at least one characteristic of the at least one user based on at least one of at least one user search history and at least one user preference selection. The processor is further configured to determine 1118 at least one probable route of the at least one transport based on at least one of at least one route history and at least one input destination and rank 1120 at least one suggestion of at least one route deviation based at least on the determined at least one probable route and determined at least one characteristic.

In another example, the processor associates at least one additional wireless device and the at least one user, and wherein the at least one user search history is based at least on searches performed utilizing the at least one additional wireless device, rates at least one suggestion of at least one route deviation based at least on the determined at least one characteristic of the at least one user and determined at least one probable route, records at least one user search history, analyzes the at least one user search history to determine at least one user hobby and determines a routing schedule based on at least one of at least one route history and at least one input destination.

Figure 12:
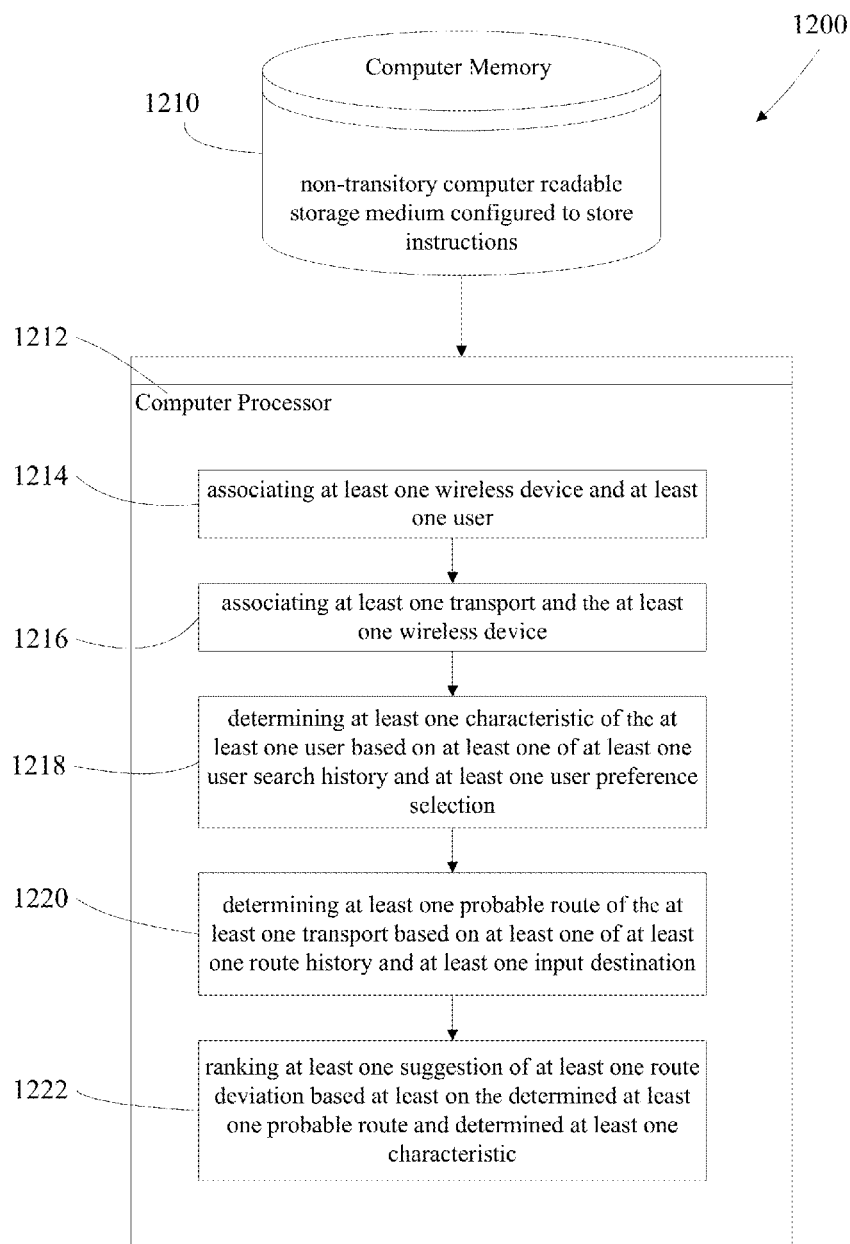
FIG. 12 illustrates a further example flow diagram of an example method of operation of a computer readable medium, in accordance with one embodiment of the disclosure.

FIG. 12 illustrates an example 1200 of a non-transitory computer readable storage medium configured to store instructions 1210 that when executed causes a processor 1212 to perform; associating 1214 at least one wireless device and at least one user, associating 1216 at least one transport and the at least one wireless device and determining 1218 at least one characteristic of the at least one user based on at least one of at least one user search history and at least one user preference selection. The processor also performs determining 1220 at least one probable route of the at least one transport based on at least one of at least one route history and at least one input destination and ranking 1222 at least one suggestion of at least one route deviation based at least on the determined at least one probable route and determined at least one characteristic.

In another example, the processor performs recording at least one user search history, analyzing the at least one user search history to determine at least one user hobby and determining at least one bargain routing based upon the at least one user hobby and at least one of at least one route history and at least one input destination.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, which may represent any of the above-described network components, etc.

Although an exemplary example of the system, method, and computer readable medium of the present disclosure has been illustrated in the accompanied drawings and described in the foregoing detailed description, it will be understood that the application is not limited to the examples disclosed, but is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture. For example, the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred examples of the present disclosure have been described, it is to be understood that the examples described are illustrative only and the scope of the disclosure is to be defined solely by the appended claims when considered with a full range of equivalents and modifications (e.g., protocols, hardware devices, software platforms etc.) thereto.

What is claimed is:
1. A method, comprising:
 associating, by a processor, at least one wireless device and at least one user;
 requesting, by the processor, audio information from at least one remote source via the at least one wireless device;
 encoding the audio information into an audio identifier using frequency shift keying;
 receiving, by the processor, the audio identifier and the audio information from the remote source via the at least one wireless device;
 broadcasting the audio identifier to the at least one wireless device, using the audio information;
 associating, by the processor, the at least one wireless device and at least one transport;

authenticating the association between the at least one wireless device and the at least one transport, based on the audio information encoded within the audio identifier;

determining at least one characteristic of the at least one user based on at least one user search previously performed on the at least one wireless device and at least one user preference;

determining a current location of the at least one wireless device;

determining at least one probable route of the at least one transport based on at least one of at least one route history and at least one input destination from the current location;

providing route deviation suggestions based upon the at least one characteristic of the at least one user, the at least one user preference, the current location, the at least one route history and the at least one input destination;

rating the route deviation suggestions from the at least one probable route based on the at least one characteristic and the at least one user preference; and receiving the rated route deviation suggestions on the at least one wireless device.

2. The method of claim 1, further comprising analyzing the at least one user search previously performed to determine at least one of at least one user hobby, at least one user sport, at least one user group and an at least one user interest.

3. The method of claim 1, further comprising rating the route deviation suggestions based at least on the at least one characteristic and the at least one probable route.

4. The method of claim 3, wherein the rating route deviation suggestions is based upon at least one rating history of previous reviewers.

5. The method of claim 1, further comprising recording the at least one user search previously performed.

6. The method of claim 1, further comprising determining at least one user location.

7. The method of claim 1, further comprising storing the at least one input destination at the at least one wireless device.

8. The method of claim 1, further comprising determining at least one routing schedule based on at least one of the at least one route history and the at least one input destination.

9. An apparatus, comprising:
a processor configured to associate, by the processor, at least one wireless device and at least one user;
request, by the processor, audio information from at least one remote source via the at least one wireless device;
encode the audio information into an audio identifier using frequency shift keying;
receive, by the processor, the audio identifier and the audio information from the remote source via the at least one wireless device;
broadcast the audio identifier to the at least one wireless device, using the audio information;
associate, by the processor, the at least one wireless device and at least one transport;
authenticate the association between the at least one wireless device and the at least one transport, based on the audio information encoded within the audio identifier;
determine at least one characteristic of the at least one user based on at least one of at least one user search previously performed on the at least one wireless device and at least one user preference;
determine a current location of the at least one wireless device;
determine at least one probable route of the at least one transport based on at least one of at least one route history and at least one input destination from the current location;
provide route deviation suggestions based upon the at least one characteristic of the at least one user, the at least one user preference, the current location, the at least one route history and the at least one input destination;
rate the route deviation suggestions from the at least one probable route based at least on the at least one characteristic and on the at least one user preference; and
send the rated route deviation suggestions to the at least one wireless device.

10. The apparatus of claim 9, wherein the processor further rates the route deviation suggestions based at least on the at least one characteristic and at least one probable route.

11. The apparatus of claim 9, wherein the processor further records the at least one user search previously performed by the at least one wireless device; and analyzes the at least one user search previously performed by the at least one wireless device to determine at least one of at least one user hobby, at least one user sport, at least one user group and an at least one user interest.

12. The apparatus of claim 9, wherein the processor further determines a route schedule based on at least one of the at least one route history and the at least one input destination.

13. A non-transitory computer readable storage medium configured to store instructions that when executed causes a processor to perform:
associating, by the processor, at least one wireless device and at least one user;
requesting, by the processor, audio information from at least one remote source via the at least one wireless device;
encoding the audio information into an audio identifier using frequency shift keying;
receiving, by the processor, the audio identifier and the audio information from the remote source via the at least one wireless device;
broadcasting the audio identifier to the at least one wireless device, using the audio information;
associating, by the processor, the at least one wireless device and at least one transport;
authenticating the association between the at least one wireless device and the at least one transport, based on the audio information encoded within the audio identifier;
determining at least one characteristic of the at least one user based on at least one of at least one user search previously performed on the at least one wireless device and at least one user preference;
determining a current location of the at least one wireless device;
determining at least one probable route of the at least one transport based on at least one of at least one route history and at least one input destination from the current location;
providing route deviation suggestions based upon the at least one characteristic of the at least one user, the at least one user preference, the current location, the at least one route history and the at least one input destination;

rating the route deviation suggestions from the at least one probable route based on the at least one characteristic and on the at least one user preference; and sending the rated route deviation suggestions to the at least one wireless device.

14. The non-transitory computer readable storage medium of claim 13, further comprising rating the route deviation suggestions based at least on the at least one characteristic and at least one probable route.

15. The non-transitory computer readable storage medium of claim 14, wherein the rating of the route deviation suggestions is based upon a rating history of previous reviewers.

16. The non-transitory computer readable storage medium of claim 13, further comprising determining at least one user location.

* * * * *